Feb. 7, 1933. W. C. GROENIGER 1,896,950
FLUSH VALVE
Filed Nov. 10, 1930 3 Sheets-Sheet 1

Inventor
William C. Groeniger
By Cushman, Byrant Darby
Attorneys

Feb. 7, 1933.  W. C. GROENIGER  1,896,950
FLUSH VALVE
Filed Nov. 10, 1930   3 Sheets-Sheet 2
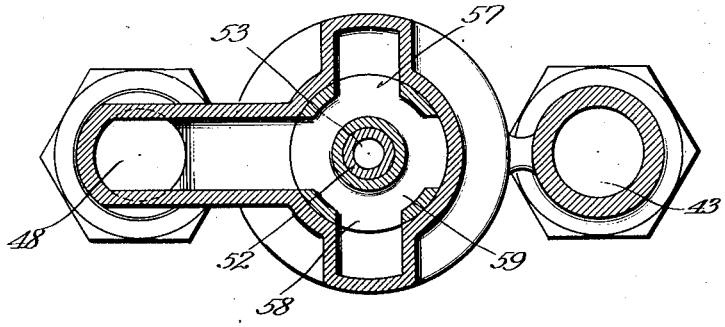
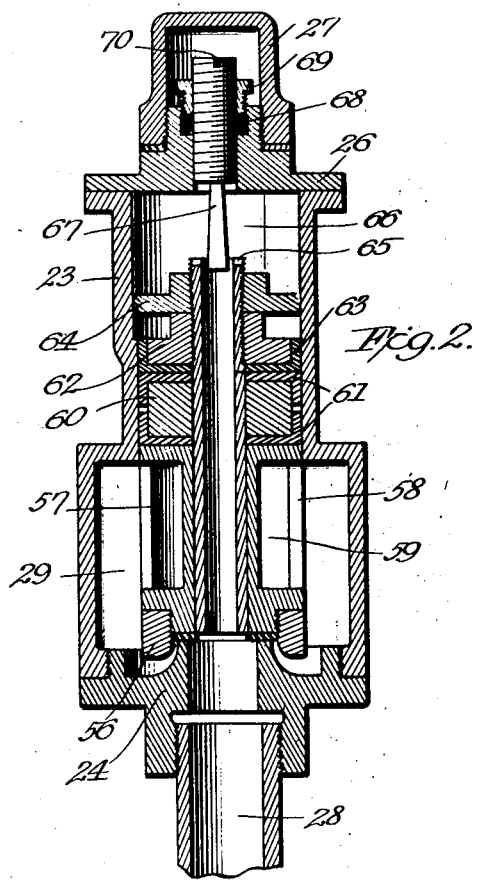
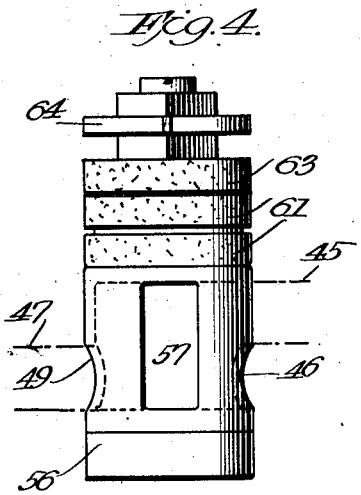
Inventor
William C. Groeniger,
By Cushman, Bryant & Darby
Attorneys Feb. 7, 1933. W. C. GROENIGER 1,896,950
FLUSH VALVE
Filed Nov. 10, 1930    3 Sheets-Sheet 3
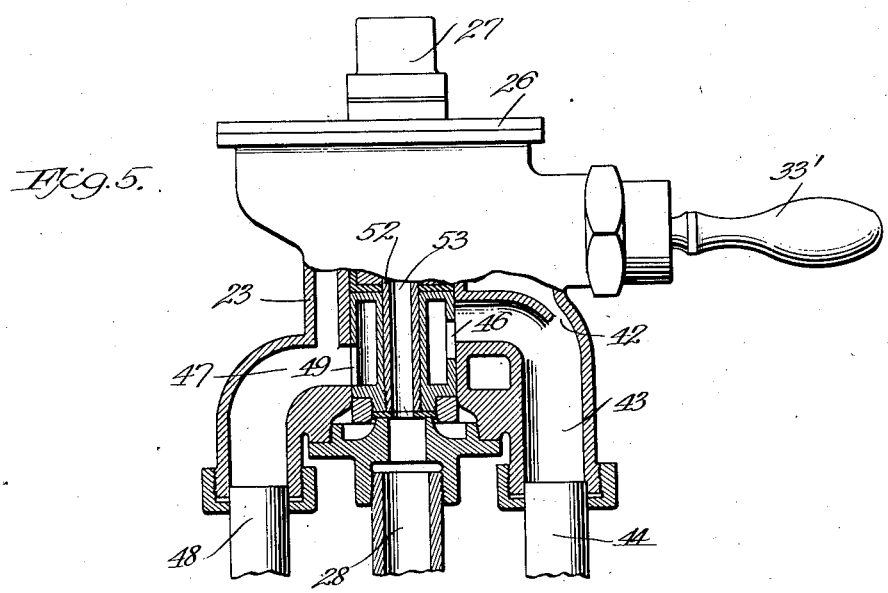
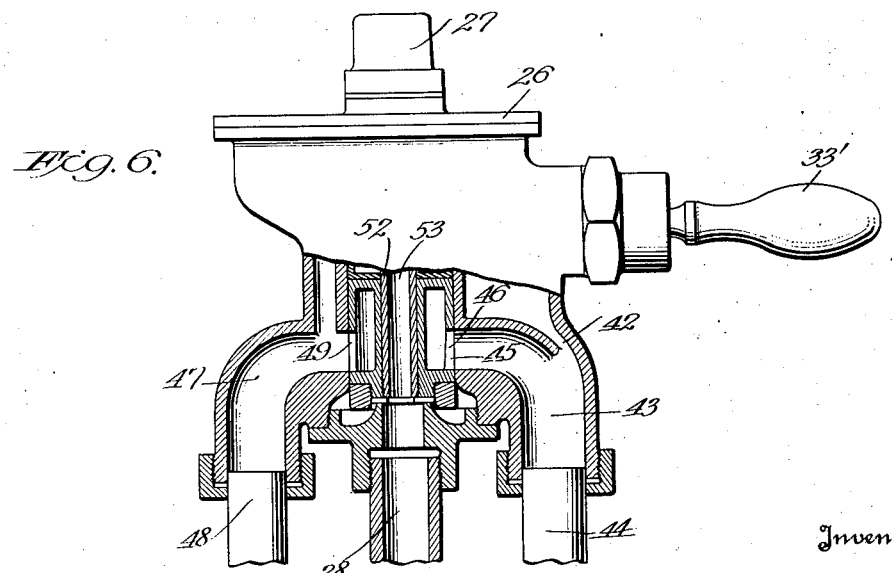
Inventor
William C. Groeniger
By Cushman, Bryant & Darby
Attorneys Patented Feb. 7, 1933

1,896,950

UNITED STATES PATENT OFFICE

WILLIAM C. GROENIGER, OF COLUMBUS, OHIO, ASSIGNOR TO MUELLER CO., OF DECATUR, ILLINOIS, A CORPORATION OF ILLINOIS

FLUSH VALVE

Application filed November 10, 1930. Serial No. 494,742.

The invention relates to a flush valve.

One of the objects of the invention is to provide a flush valve having two separate, distinct, and independent connections to a plumbing fixture.

Another object of the invention is to provide a flush valve for plumbing fixtures where two or more functions of predetermined sequence are required or where simultaneous functions are required.

Another object of the invention is to provide a flush valve in which all enlargements, baffles, and restrictions are reduced to a minimum in order that the pressure or head will not be materially reduced from its entrance to its exit from the valve.

Still another object of the invention is to provide a flush valve which is designed to be positioned above the overflow point of the plumbing fixture, which, together with the novel construction of the valve, prevents the polution of the water supply by the return of waste water through the valve into the main supply pipe.

With these and other objects and advantages in mind, attention is called to the drawings, in which:

Figure 2 is a sectional view of the flush valve taken on the line B—B of Figure 1.

Figure 3 is a sectional plan view of the flush valve taken on the line C—C of Figure 1.

Figure 4 is an enlarged elevation of the plunger member of the flush valve.

Figure 5 is a view partly in section of the flush valve showing another arrangement of ports in the plunger whereby a different sequence of operation may be obtained.

Figure 6 is a view partly in section of the flush valve showing still another arrangement of structure whereby still a different sequence of operation may be obtained.

Figure 1:
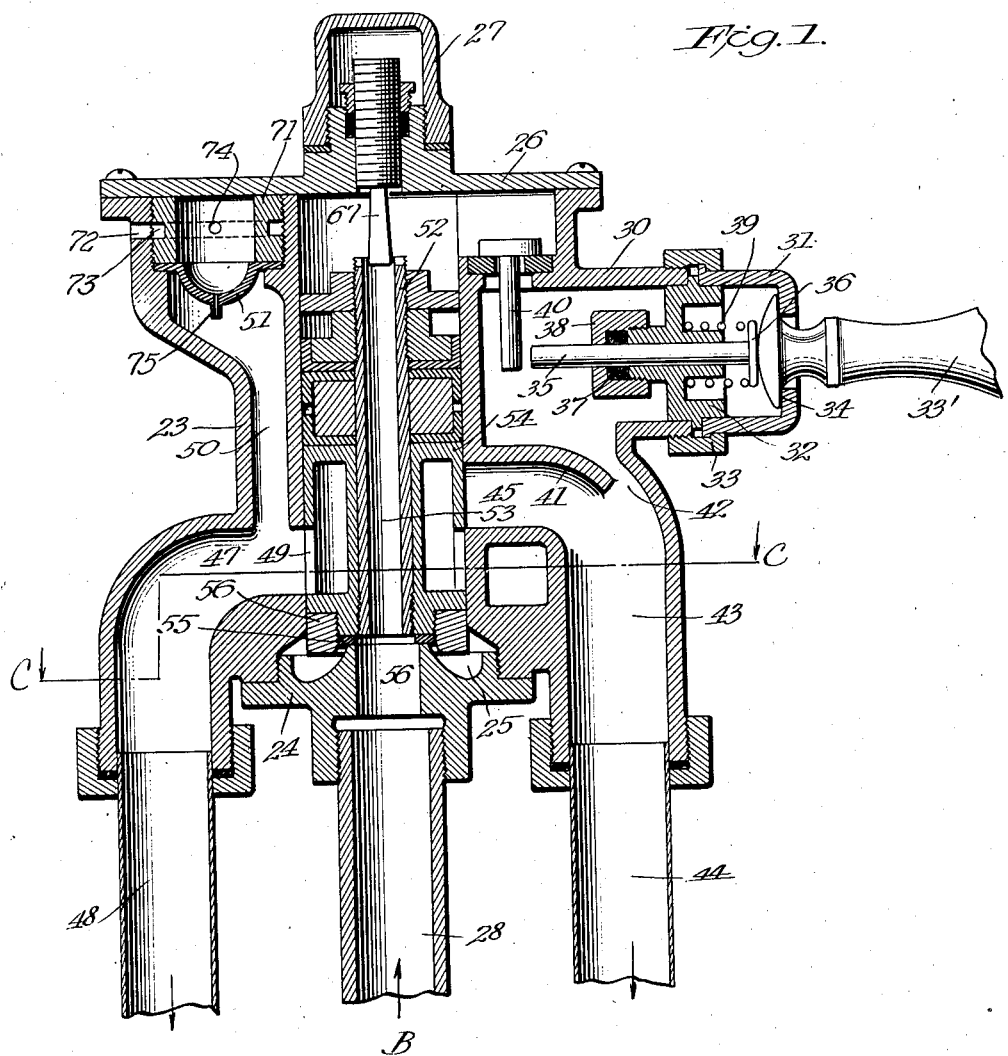
Figure 1 is a sectional view of the flush valve.

Referring more specifically to the drawings, in which like numerals indicate like parts, the flush valve is of plunger type having two discharge openings, and comprises a main body 23 into which screws an inlet plug 24, having recesses 25, and upon which is detachably secured a valve top 26. A cap 27 is removably attached to the valve top, and a water supply pipe 28 screw threads into the inlet plug 24. A distribution chamber is provided at 29, as shown in Figure 2.

Extending laterally to one side of the valve is the trip valve boss 30. Between said boss and the trip valve cap 31 is held the trip valve body 32. A lock nut 33 surrounds the juncture of the boss and cap and securely holds them in place.

A trip valve handle 33' extends through an opening in the cap 31 and has a bearing 34 attached thereto and in contact with the trip valve rod 35, having cap 36. The trip valve rod 35 extends through the trip valve body 32, which is provided at its inner end with a packing gland 37 and cap 38 to prevent water leaking through the valve handle assembly. A spring 39 is interposed between the trip valve body 32 and the cap 36 in order to return the trip valve rod to its normal position after it is released.

A trip valve 40 seated on a washer is positioned adjacent the trip valve rod 35 and is actuated thereby. A partition 41 extends laterally below the trip valve chamber and forms the bottom thereof, there being left sufficient space between said partition and the body wall to form an outlet 42 which empties into the supply passage 43 and pipe 44. Below the partition 41 is a passage 45 which leads from the plunger port 46 and opens into the supply passage 43.

A supply passage is provided at 47 and has attached thereto the supply pipe 48. The plunger port 49 empties into the passage 47, and above said passage extends an air passage 50 leading to the air intake valve 51.

The plunger comprises a central shaft 52 through which runs a passage 53, a main body 54 having a seat washer 55, and a seat washer cap 56. Referring more particularly to Figures 2 and 4, the main body 54 is provided with two inlet ports 57 and 58 and an interior supply passage 59 which connects the inlet port 57 with the plunger port 49 and the inlet port 58 with the plunger port 46. Above the main body of the plunger is a cup washer spacer 60, on either side of which are cup washers 61. A cup washer locking nut is provided at 62, and has cup washer 63. A plunger guide nut 64 rests upon the lock nut 62 and prevents the plunger from turning, thereby maintaining the various ports in their proper locations. Slots 65 are provided near the top of the plunger shaft in order that the supply of water flowing into the chamber 66 above the plunger through passage 53 will not be shut off when said shaft is flush against the top of the valve.

A needle valve 67 is adjustably screw threaded into the valve top and is provided with a packing gland 68 and a packing gland nut 69. By means of the slot 70 in the top of the needle valve, it can be adjustably positioned by turning it in the desired direction. Easy access to this adjustment is procured by simply removing the valve cap 27. The needle valve extends into the central passage 53 and its adjustment determines the flow of water into the chamber 66.

The air intake valve 51 conveys air to the flush valve and comprises a sleeve 71 having inlets 72 which lead into passages 73 to openings 74, from where the air will pass through the valve seat 75 into the passage 50.

The operation of the valve is as follows:

When in closed position, as shown in Figure 2, the chamber 66, known as the "equalizing chamber", will be filled with water by means of the passage 53, and the plunger port 49 will be opened, and the plunger port 46 will be closed. Movement of the handle 33′ will cause the trip valve rod 35 to unseat the trip valve 40, and the water from the equalizing chamber 66 will flow down into the supply passage 43 and out supply pipe 44. The discharging of the water from the equalizing chamber will cause the plunger to rise, due to pressure of water on the bottom of said plunger. As the plunger rises, the water will flow into the recesses 25 through the distribution chamber 29, through the inlet ports 57 and 58, into the interior supply pipe 59, which will deliver the water to the plunger port 49 and the plunger port 46 as follows: Water is supplied immediately to both supply pipe 44 and supply pipe 48, the supply pipe 44 being increased as the supply to pipe 48 is diminished, and finally cut off as the plunger reaches its uppermost position.

When the handle 33′ is released, the trip valve 40 will reseat, and the equalizing chamber 66 will be refilled with water by means of the passage 53. The pressure of the water in the equalizing chamber 66 increases until it equals the pressure of the water on the bottom of the plunger, and because of the greater effective area on top of the plunger, it is forced downwardly and the supply to pipe 48 is increased as the supply to pipe 44 begins to decrease. As the plunger approaches its seat, the flow to both pipes is lessened, the flow to pipe 44 being lessened more rapidly than the flow to pipe 48, since port 46 is being cut off. When the plunger is finally seated, the flow to both pipes ceases.

The length of flush and timing of the valve is adjusted by means of the needle valve 67 which controls the rate of flow of water through the passage 53 into the equalizing chamber 66.

The central passage 53 is sufficiently large to prevent any clogging, and it will be noted that the needle valve will clean this passage at each operation of the valve. Easy access can be had to all parts of the valve by simply removing the valve top.

Siphonic action which would return any of the contents of the closet bowl through the flush valve into the water supply pipe 28, will be prevented by the air intake valve 51, which will admit air and break the siphon.

The arrangement of plunger ports in the particular disclosure of the flush valve shown in Figures 1 to 4 of the drawings produces a sequence of operation which supplies water with high velocity simultaneously at first to both supply pipes, the flow to pipe 48 being greater, and then decreasing as the flow to pipe 44 increases, followed by a decrease in flow to the pipe 44 and an increase in flow to the pipe 48 as the valve closes and the flow to both pipes is cut off. By such an arrangement, there is accomplished substantially a supply of water with high velocity to the pipe 48, then a supply of water with high velocity to the pipe 44, and again, a supply of water with high velocity to the pipe 48.

It is, of course, possible by means of different arrangements of plunger ports to vary the sequence of flushes between the supply pipes 44 and 48.

As an example, assuming that the valve were attached to a plumbing fixture such as a water closet and that supply pipe 44 emptied into a rim flush and supply pipe 48 emptied into a jet flush, if the valve were placed in a reversed position whereby the supply pipe 44 emptied into a jet flush and supply pipe 48 emptied into a rim flush, the sequence of operation would be reversed as affecting the water closet, and the flow to the rim and jet flushes changed accordingly.

Referring particularly to Figure 5, there is illustrated a different arrangement of plunger ports to effect a different sequence of operation. It will be noted that plunger port 46 is located above plunger port 49. When the handle is actuated, there will result a supply of water with high velocity through supply pipe 44, and a supply of water through pipe 48, the latter being greater than the former, which (the former) will increase in volume as the plunger rises. As the plunger returns, the flow to the pipe 44 decreases and the flow to the pipe 48 increases. However, the flow to pipe 44 in this arrangement continues during the entire operation of the valve with varying volume.

Referring to Figure 6, the passage 45 leading into the supply pipe 44 is lowered so that the port 46 opens therein when the plunger is in normally closed position. The sequence of operation in this particular form is simultaneous flows through supply pipes 44 and 48, which continue until the plunger reaches its uppermost position and the ports are closed, and simultaneous flows through supply pipes 44 and 48 on the downward movement of the plunger until it is seated.

It is obvious from the foregoing description that the flush valve forming this invention is extremely simple in construction, but exceedingly efficient in operation, and meets all the requirements of sanitation.

It is understood that various modifications of the invention may be made without departing from the scope of the appended claims.

I claim:

1. In a valve, an intake supply passage, independent outlet passages, a plunger having ports, a chamber above said plunger and communicating with one of said outlet passages when said valve is actuated, a trip valve opening into said chamber, means to unseat said trip valve, said ports communicating with said outlet passages, and said ports being arranged in said plunger to direct the flow of water in various sequences to said outlet passages.

2. In a valve, an intake supply passage, independent outlet passages, a plunger having ports, a chamber above said plunger and communicating with one of said outlet passages when said valve is actuated, a trip valve between said chamber and one of said outlet passages, means to unseat said trip valve, said ports communicating with said outlet passages, and said ports being arranged in said plunger to direct the flow of water in various sequences to said outlet passages.

3. In a valve, an intake supply passage, independent outlet passages, a plunger having ports, a chamber above said plunger and communicating with one of said outlet passages when said valve is actuated, a trip valve between said chamber and one of said outlet passages, manual means to unseat said trip valve, said ports communicating with said outlet passages, and said ports being arranged in said plunger to direct the flow of water in various sequences to said outlet passages.

4. In a valve, an intake supply passage, independent outlet passages, a hollow plunger having ports, a chamber above said plunger and communicating with one of said outlet passages when said valve is actuated, a needle valve positioned within said chamber and extending into said plunger, operating means for said valve, said ports communicating with said outlet passages, and said ports being arranged in said plunger to direct the flow of water in various sequences to said outlet passages.

5. In a valve, an intake supply passage, independent outlet passages, a hollow plunger having ports, a chamber above said plunger and communicating with one of said outlet passages when said valve is actuated, an adjustable needle valve positioned within said chamber and extending into said plunger, operating means for said valve, said ports communicating with said outlet passages, and said ports being arranged in said plunger to direct the flow of water in various sequences to said outlet passages.

In testimony whereof I have hereunto set my hand.

WILLIAM C. GROENIGER.